April 24, 1928.
F. W. STOCKMEYER
1,667,401
TESTING METHOD AND APPARATUS
Filed Sept. 21, 1926
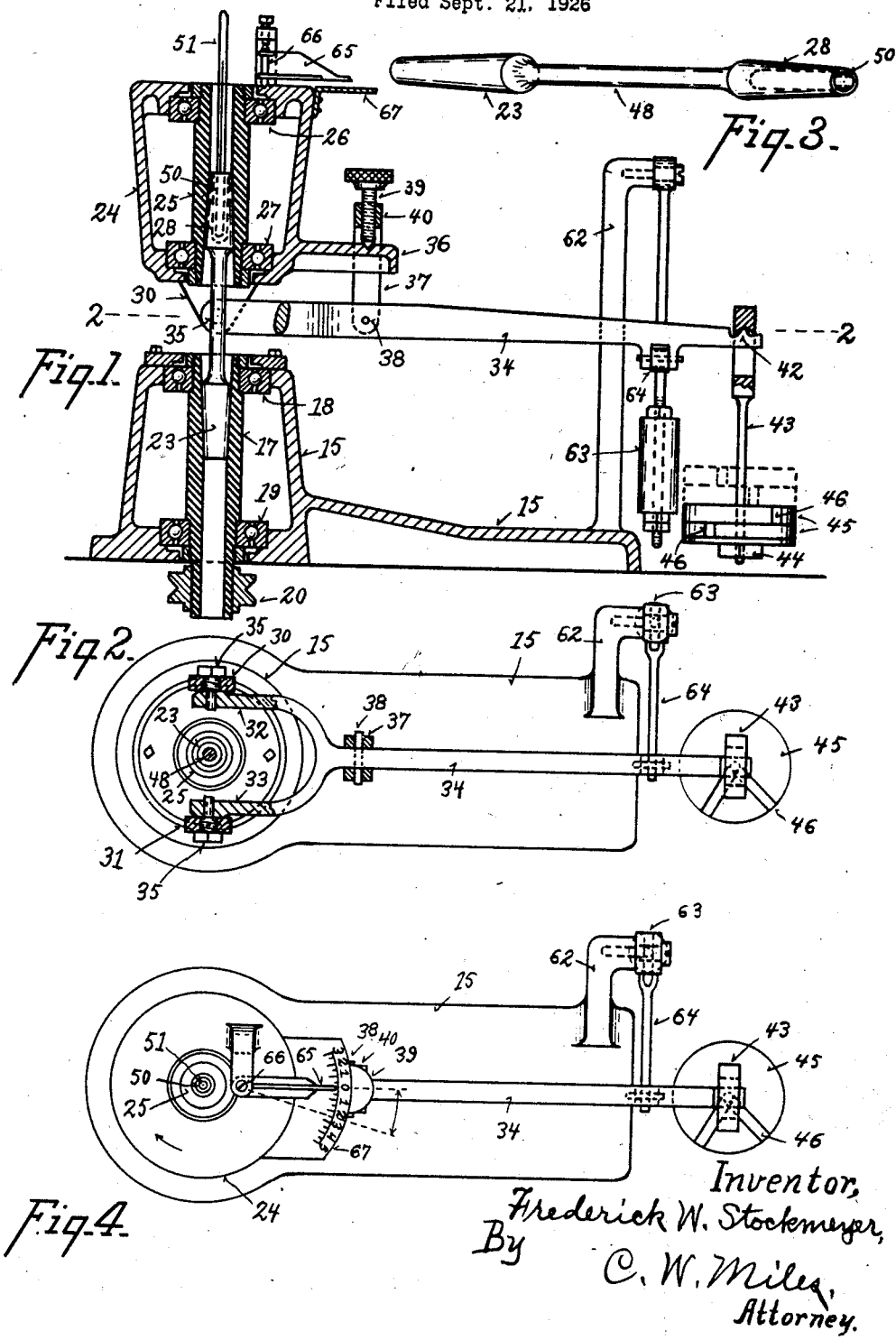
Inventor,
Frederick W. Stockmeyer,
By C. W. Miles,
Attorney.

Patented Apr. 24, 1928.

1,667,401

UNITED STATES PATENT OFFICE.

FREDERICK W. STOCKMEYER, OF CINCINNATI, OHIO.

TESTING METHOD AND APPARATUS.

Application filed September 21, 1926, Serial No. 136,859, and in Germany June 11, 1925.

My invention relates to improvements in method and apparatus for testing metals for fatigue. One of its objects is to provide an improved method and apparatus for holding the test bars and applying the testing strain thereto. Another object is to provide an improved method and apparatus to apply the testing strain uniformly over the longitudinal section of the bar under strain instead of concentrating the maximum strain upon a fraction of said section. Another object is to provide apparatus adapted to load the testing bar by a real weight in place of employing a calibrated spring. Another object is to provide for a continuous indication or record of the temperature of the testing bar during the testing operation. Another object is to provide improved testing apparatus in which while one end of the bar is restrained to a predetermined axis of rotation, the opposite end of the bar is unrestrained as to its axis of rotation. Another object is to provide improved method and apparatus for reliably determining the point at which non-elastic deformation of the test bar commences and the ratio of non-elastic and the elastic deformation. My invention also comprises certain details of form arrangement, and combination of components and method of procedure, all of which will be fully set forth in the description of the accompanying drawings, in which:

Fig. 1 is a central vertical section through a testing apparatus embodying my improvements.

Fig. 2 is a horizontal section through the same taken on line 2—2 of Fig. 1.

Fig. 3 is a perspective view of one of the testing bars.

Fig. 4 is a plan view of Fig. 1.

The accompanying drawings illustrate the preferred embodiment of my improved apparatus in which 15 represents a rigid base or frame member adapted to be stationarily mounted. A tubular spindle 17 is journaled in a vertical position in the base member 15 preferaby by means of ball bearings 18 and 19 near opposite ends of said spindle. A driving pulley, gear, or other driving member 20 is rigidly attached to the spindle 17. A portion of the length of the bore of the spindle 17 is preferably tapered to substantially a Morse taper in order to receive the tapered lower end section 23 of the test bars and thereby couple the test bars in driving relation with the spindle 17 without liability of vibration or lost motion. If desired the lower end of the test bar may be rigidly clamped in place relative to the spindle 17 in any desired manner.

A bearing housing 24 is provided with a tubular bearing spindle 25, preferably journaled to said housing 24 by means of ball bearings 26 and 27 near opposite ends of said spindle. A portion of the bore of the spindle 25 is preferably tapered to register with the tapered upper end 28 of the testing bar, and to thereby engage the upper end of the test bar in driving relation with the bearing spindle 25. At its lower end the bearing housing 24 is provided with two downwardly directed ears or projections 30 and 31, to which the forked ends 32 and 33 of a deflecting beam 34 are pivotally attached by means of pins or stud bolts 35. The bearing housing 24 is also provided with a lateral extension 36 which serves as a bearing support for a yoke 37, the forked ends of which yoke 37 are attached by a pin 38 to an intermediate portion of the deflecting beam 34. An adjusting screw 39 is threaded through the middle section 40 of the yoke 37, and its pointed lower end is seated in a depression in the upper face of the extension 36 so as to practically serve as a knife edge support for the beam 34. At the free end of the deflecting beam is provided a knife edge bearing 42 upon which is mounted the eye of an eye bolt 43. A nut 44 is secured to the lower end of the eye bolt 43 to serve as a support for one or more detachable weights 45 each of which has a slot 46 extending from its edge to its center to enable said weights to be detachably mounted and removed at will.

The test bar is counter-bored at 50 at its upper end to receive a small quantity of liquid and a thermometer 51 to register upon the thermometer the temperature of the test bar during the testing operation. In operation the weight of the bearing housing, the beam 34 and eye bolt 43, and weights 45 all rest upon the test bar, and the beam 34 and weights 45 being considerably to one side of the center of gravity, or the vertical axis of the test bar, tend to flex or bend the central section 48 of the test bar, which has been carefully turned or dressed to a predetermined length and cross-sectional diameter.

A freely movable pendulum 65 is journaled relative to the bearing housing 24 upon an axle 66 which is parallel to the axis of the spindle 25 and to the axis of the bearing housing 24 and to the axis of the upper section 28 of the test bar. The free end of the pendulum 65 is movable freely by gravitation over a scale 67 carried by the bearing housing 24. A projection or bracket 62 extends upwardly rigidly relative to the base 15. A pendulum 63 is suspended pivotally from the upper end of the bracket 62. A link 64 is connected pivotally at one end to the pendulum 63 and at its opposite end is pivotally attached to the beam 34, so that any torsional strain tending to rotate the bearing housing 24 and beam 34 will deflect the pendulum 63 out of its normal position and the amount of this deflection of the pendulum 63 may be indicated by a pointer movable over a scale. When weights are applied to the beam 34, and the strain upon the testing bar is within the elastic limit of the metal of the test bar, the normal position of the pendulum 65 is as shown in Fig. 4 in substantially the same plane with the beam 34, and the pendulum 65 will retain substantially this relation to the beam 34 whether the test bar is at rest, or is being rotated, so long as the strain upon the test bar is within the elastic limit of the metal of the test bar.

When power is applied to drive the spindle 17 at a high rate of speed, say from one thousand revolutions per minute up to twelve thousand revolutions per minute, the test bar is rotatively driven by and with the spindle 17 at the same rate of speed, and the spindle 25 is driven in its bearing house 24 at the same rate of speed. The bearing housing 24, due to the weighted beam 34, and the elasticity of the middle section 48 of the test bar, is inclined to a greater or less degree toward the weighted end of the beam 34, assuming that the strain on the test bar is within its elastic limit. For strains not exceeding the elastic limit of the metal, the pendulum 65 registers substantially zero on the scale 67.

After the test bar is in rotation the amount of weight on the beam 34 is gradually increased, thereby increasing the extent to which the middle section 48 of the test bar is deflected from its normal vertical axis. Readings of the temperature as indicated by the thermometer, the declination of the pendulum 65 from its normal or zero position, and the inclination of the pendulum 63 from its normal position are taken and registered for each addition of weight upon the beam 34, which may all be attained without interrupting the rotation of the test bar, and within a relatively short period of time.

Ultimately the limit of normal elasticity of the metal of the test bar is reached, and non-elastic deformation of the metal of the test bar commences, and the chief object of the test is to determine with accuracy the commencement of non-elastic deformation of the metal. The symptoms of non-elastic deformation or fatigue of the metal are with my improved method and apparatus manifested by an increase in the temperature of the test bar, by a change in the deflection slope, or angularity of the bearing housing, whereby the deflection of the bearing housing is no longer in the same plane with the beam 34, and which change is indicated by a movement of the pendulum 65 over the scale 67 from zero to a position advanced in the direction of rotation of the test bar as indicated substantially in dotted lines in Fig. 4. Also the strain exerted by the beam 34 upon the pendulum 63 is increased in degree. The deflection of the pendulum 65 or equivalent pointer is regarded as the most characteristic and reliable indication that non-elastic deformation of the metal has commenced, but the increase in temperature and increased deflection of the pendulum 63 when coincident with the indications of pendulum 65, may be taken as a control.

The yoke 37 and adjusting screw 39 enable the beam 34 to be primarily adjusted to a substantially horizontal position before the weights are applied, or subsequently if desired. It has ordinarily heretofore required several days to complete a fatigue test of a metal bar, requiring long periods of rotation after each change of weight. Employing my improved method and apparatus, the weight may be increased without interrupting rotation of the test bar. The vertical position and mounting of the test bar insures the upper end of the test bar having a freely floating or unrestrained bearing, and automatically distributes the strain evenly and uniformly over the entire length of the central or test section of the bar, so as to provide true, accurate, and reliable tests. The weight of the bearing housing and parts resting upon the test bar, substantially axially thereof may be neglected so far as the accuracy of the test is concerned or if desired may be otherwise supported. Employing my improved method and apparatus, accurate metal fatigue tests may ordinarily be completed within ten to fifteen minutes from the commencement thereof.

The herein disclosed method and apparatus are capable of considerable modification within the scope of the claims without departing from the spirit of my invention.

What I claim is.

1. A method of testing comprising rotating a test bar in a substantially vertical position with one end of the bar upon a fixed axis of rotation and the opposite end of the bar unrestrained, and applying a bending moment to said bar substantially uniform over the whole length of the section under test.

2. A method of testing comprising rotating a test bar with one end upon a fixed axis of rotation, and applying a bending moment to the opposite and unsupported end of the testing bar, resulting in a bending moment substantially uniform over the whole length of the section under test, with the unsupported end of the test bar otherwise unrestrained and free to show the bending deflection.

3. A method of testing comprising rotating a test bar which is fixed at one end as to axial position, applying a bending moment to the opposite unrestrained end of the test bar, and indicating the tortional moment.

4. A method of testing comprising rotating a test bar with one end upon a fixed substantially vertical axis of rotation, applying a bending moment to the opposite end of the test bar, and indicating the declination of the plane of deflection relative to the plane of bending moment.

5. A method of testing comprising rotating a test bar with one end upon a fixed substantially vertical axis of rotation, applying a bending moment to the opposite end of the test bar, and indicating the temperature changes of the test bar and the deflection of the unrestrained portion of the test bar.

6. A testing apparatus comprising a supporting frame, a substantially vertical driving spindle journaled to said frame, and adapted to be positively driven, means to support one end of a test bar axially of said driving spindle, to be driven therewith, and with the opposite end of said test bar unrestrained, a bearing spindle adapted to be mounted upon the unrestrained end of said test bar, a bearing housing rotatably supported upon the bearing spindle, a beam supported from said bearing housing and adapted to apply a bending moment to said test bar, and means to indicate the tortional deflection of said bearing housing.

7. A testing apparatus comprising a supporting frame, a substantially vertical driving spindle journaled to said frame, and adapted to be positively driven, means to support one end of a test bar axially of said driving spindle to be driven therewith and with the opposite end of said test bar unrestrained, a bearing housing adapted to be rotatively supported upon the unrestrained end of the test bar and adapted to apply a bending moment to the unrestrained end of the test bar, and means to indicate the declination of the plane of bending deflection to that of bending moment.

8. A testing apparatus comprising a supporting frame, a substantially vertical driving spindle journaled to said frame, and adapted to be driven positively, means to support one end of a test bar axially of said spindle and in driving relation therewith and with the opposite end of said test bar unrestrained, a bearing housing adapted to be rotatively supported upon the unrestrained end of the test bar and adapted to apply bending moment to the unrestrained end of the test bar, and means to indicate temperature changes in said test bar during the testing operation.

9. A testing apparatus comprising a supporting frame, a substantially vertical tubular driving spindle journaled to said frame and adapted to be positively driven, means to support one end of a test bar axially of and in driving relation to said spindle and with the central portion and opposite end of said test bar unrestrained, a bearing spindle adapted to be mounted upon the unrestrained end of said test bar, a bearing housing journaled upon said bearing spindle, a beam supported from said bearing housing and adapted to apply a strain laterally to the unrestrained portion of said test bar, and means to indicate the deflection of said test bar.

10. A testing apparatus comprising a supporting frame adapted to support a test bar rotatively upon said supporting frame upon a substantially vertical fixed axis of rotation with the central portion and opposite end of said test bar unrestrained, a bearing housing adapted to be rotatively mounted upon the unrestrained end of said test bar, means to apply a bending moment to said bearing housing, and means carried by said bearing housing to indicate the declination of the plane of bending deflection.

In testimony whereof I have affixed my signature.

FREDERICK W. STOCKMEYER.